United States Patent [19]
Wilk et al.

[11] Patent Number: 6,165,527
[45] Date of Patent: *Dec. 26, 2000

[54] BAGEL MAKING MACHINE AND ASSOCIATED METHOD

[76] Inventors: Peter J. Wilk, 160 Third Ave., New York, N.Y. 10003; Joshua Weisberger, 225 Marine Ter., Hillside, N.J. 07205

[ * ] Notice: This patent is subject to a terminal disclaimer.

[21] Appl. No.: 09/263,319

[22] Filed: Mar. 5, 1999

[51] Int. Cl.[7] ................................................. A23P 1/10
[52] U.S. Cl. .......................... 426/279; 426/138; 426/280; 426/282; 426/283; 426/284; 426/512; 426/514; 426/549
[58] Field of Search ................................. 426/138, 139, 426/280, 282, 283, 284, 549, 512, 514, 279; 99/352, 353, 354, 355, 356, 426

[56] References Cited

U.S. PATENT DOCUMENTS

| | | | |
|---|---|---|---|
| 1,589,850 | 6/1926 | Haskell | 426/138 |
| 2,018,950 | 10/1935 | Couture | 426/514 X |
| 2,810,338 | 10/1957 | Dawson | 426/138 X |
| 3,290,154 | 12/1966 | Turner | 426/138 X |
| 3,341,167 | 9/1967 | Weiss | 426/138 X |
| 3,410,691 | 11/1968 | Stanley | 426/283 X |
| 4,009,859 | 3/1977 | Bangert | 426/138 X |
| 4,065,581 | 12/1977 | Heiderpriem | 426/138 |
| 4,214,517 | 7/1980 | Caldwell | 426/138 X |
| 5,000,084 | 3/1991 | Walliker | 426/279 X |
| 5,223,286 | 6/1993 | Selbak | 426/139 X |
| 5,641,527 | 6/1997 | Burger | 426/283 X |
| 5,654,012 | 8/1997 | Burger | 426/283 X |
| 5,807,599 | 9/1998 | Weisberger et al. | 426/279 |
| 5,968,570 | 10/1999 | Paulucci | 426/283 X |
| 6,030,651 | 2/2000 | Bronner | 426/138 X |

*Primary Examiner*—Milton Cano
*Attorney, Agent, or Firm*—R. Neil Sudol; Henry D. Coleman

[57] ABSTRACT

A machine for making a food product includes a cooking apparatus for cooking an aliquot of dough disposed in a predetermined shape about a cooking member made of a material which has a chemical composition essentially impervious to cooking temperatures. The machine also incorporates a mechanism for extracting the cooking member from the cooked dough, thereby creating a chamber in the cooked dough. This mechanism has a gripper which is disposable in grasping contact with a protruding end of the cooking member, a holder disposable in contact with the cooked dough for restraining the cooked dough, and a motive component operatively connected to at least one of the holder and the gripper for moving the one of the holder and the gripper relative to the other to remove the cooking member from cooked dough.

19 Claims, 3 Drawing Sheets

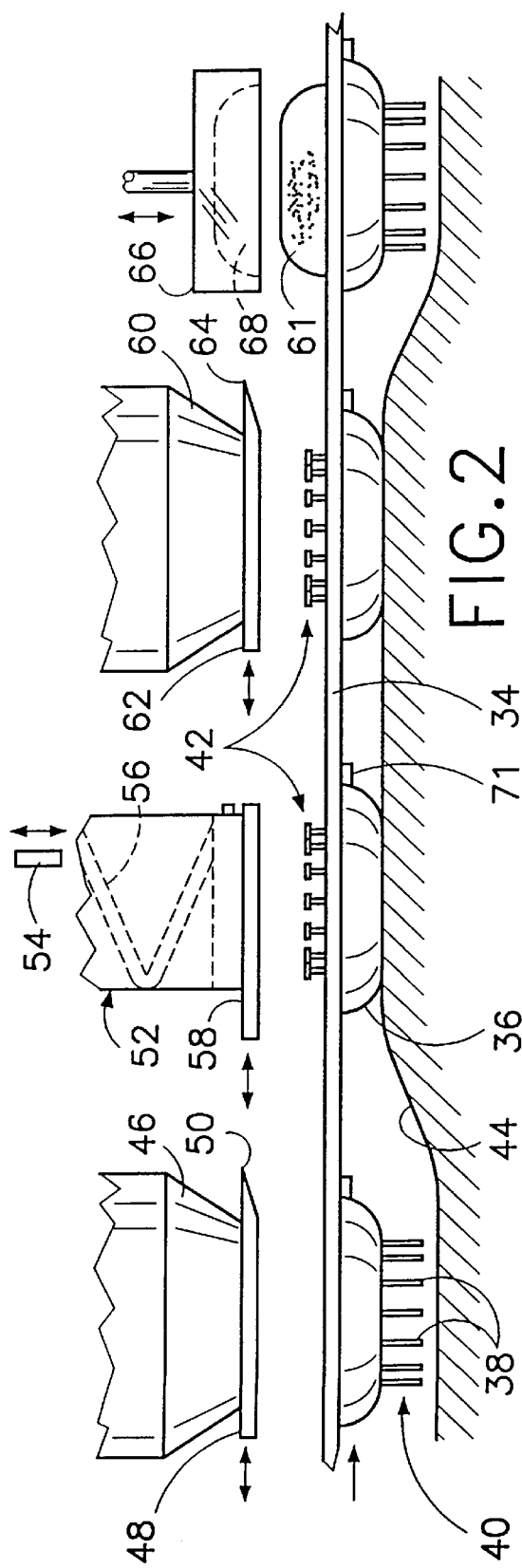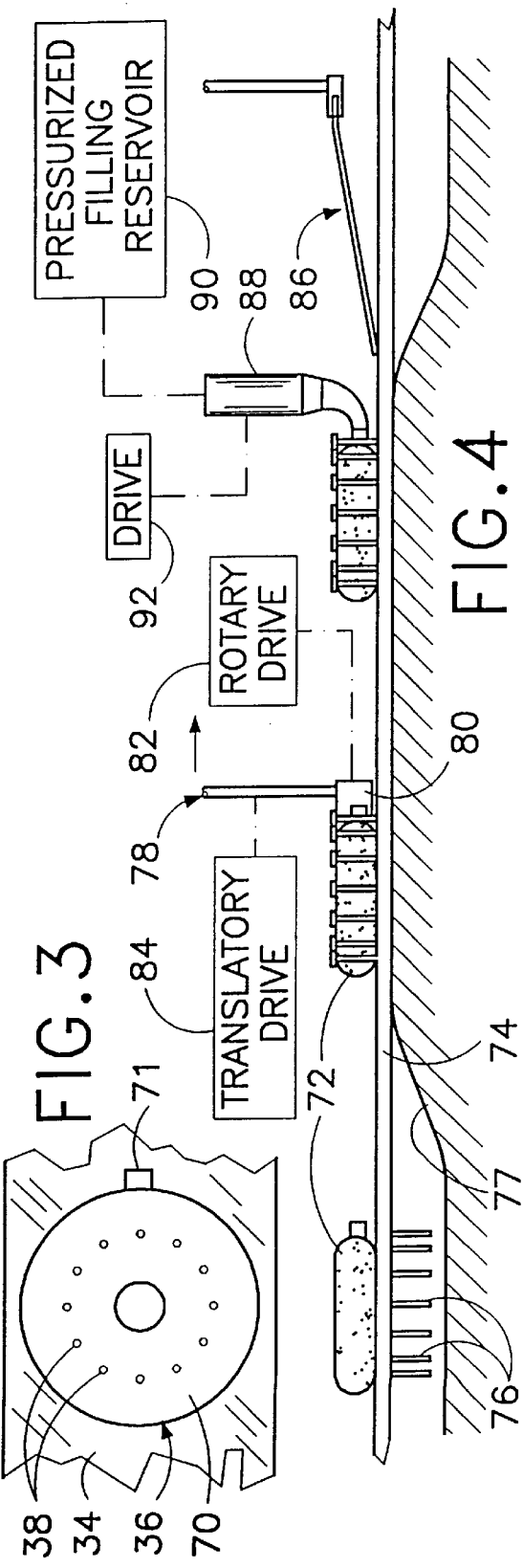

BAGEL MAKING MACHINE AND ASSOCIATED METHOD

BACKGROUND OF THE INVENTION

This invention relates to a machine for preparing a finished food product. More particularly, this invention relates to a machine for cooking discrete food articles such as bagels.

The tastiest parts of certain baked food products such as muffins and bagels are those which are browned owing to exposure to an oven's convection currents. In eating muffins, people frequently separate the crowns from the bodies of the muffins in order to savor the enhanced flavor of the crowns. Likewise, in eating bagels, some people characteristically remove the inner, doughy parts of the bagel and eat only the shell, either alone or with filling such as a cream cheese and scallion spread or a salmon spread. Where a bagel is used to make a sandwich type food item, the hollowing out of the bagel provides the additional advantage of reducing the amount of filling that is squeezed out from between the bagel halves when the consumer bites into the bagel. Concomitantly, a hollow bagel is able to accommodate a greater amount of filling material.

A problem with the conventional manual method of removing dough from the interior of a bagel is inconvenience to the consumer. Another problem is waste that occurs when the removed interior dough is discarded rather than eaten.

Although certain food products such as doughnuts are frequently made with hollow interiors, into which a cream or fruit filling may be deposited, the method by which that hollow interior is formed is not applicable to bagels. Doughnuts can be made from a dough which separates during deep frying to produce an interior chamber. Bagels are cooked by an initial boiling step and a subsequent baking step. Bagels with hollow interiors will not naturally form during the two-step cooking process.

U.S. Pat. No. 5,807,599 describes a method for making a food product which utilizes an aliquot of dough disposed in a predetermined shape about a cooking member made of a material which has a chemical composition essentially impervious to cooking temperatures. The dough is cooked, e.g., boiled or baked, at a predetermined temperature for a predetermined period. The cooking member is maintained in the dough during the cooking thereof. After the cooking of the dough at the predetermined temperature for the predetermined period, the cooking member is removed from the cooked dough, thereby creating a chamber in the cooked dough.

Generally, as described in U.S. Pat. No. 5,807,599, the dough is molded about the cooking member to form the predetermined dough shape about the cooking member. Alternatively, the cooking member may be inserted or pressed into a lump of the dough.

According to U.S. Pat. No. 5,807,599, the cooking member is an elongate member made of a flexible material such as silicone. In that case, the elongate member may be bent to assume a desired form such as a circle. The dough generally conforms to the bent cooking member. The dough has a toroidal shape when the cooking member is bent into a circle.

As disclosed in U.S. Pat. No. 5,807,599, an end of the elongate member is left protruding from the uncooked dough form. After the dough is cooked, the elongate member is removed from the dough by grasping the protruding end of the elongate member and pulling the elongate member from the cooked dough. An edible filling may be injected or otherwise deposited into the chamber of the hollow dough cooked product after the pulling of the elongate member from the cooked dough.

OBJECTS OF THE INVENTION

An object of the present invention is to provide a method for producing a cooked food product having an internal chamber for receiving an edible composition.

Another object of the present invention is to provide a machine for cooking or baking a food product so that the food product has a hollow interior for receiving an edible composition.

It is an additional object of the present invention to provide such a machine which is suitable for producing a hollow bagel.

A further object of the present invention is to provide such a machine which produces a food product which is provided with a filling.

It is a related object of the present invention to provide an automated method of cooking or baking a food product so that the food product has a hollow interior.

Another associated object of the present invention is to provide such a method which is applicable to a bagel.

A supplemental object of the present invention is to provide an automated method of manufacturing a food product which is provided with a filling.

These and other objects of the present invention will be apparent from the descriptions and illustrations herein.

SUMMARY OF THE INVENTION

A machine for making a food product comprises, in accordance with the present invention, a cooking apparatus for cooking an aliquot of dough having an internal chamber formed by disposing the dough in a predetermined shape about a cooking member made of a material which has a chemical composition essentially impervious to cooking temperatures. The machine further comprises a mechanism for removing the cooking member from the dough, thereby creating the internal chamber in the dough. This mechanism includes a gripper disposable in grasping contact with a protruding end of the cooking member, a holder disposable in contact with the dough for restraining the dough, and a motive component operatively connected to at least one of the holder and the gripper for moving the one of the holder and the gripper relative to the other to remove the cooking member from the dough.

The mechanism for removing the cooking member may be actuated prior to the cooking of the dough. In that case, it may be desirable to chill the dough to enhance the likelihood that the dough will maintain its predetermined shape and that the internal chamber will maintain a predetermined configuration essentially matching that of the cooking member prior to removal thereof from the dough.

Preferably, the cooking member is subjected to elevated temperatures along with the shaped dough and is removed from the dough after the cooking thereof.

The cooking apparatus includes a baking oven and may include a molding component for shaping the dough about the cooking member to form the predetermined shape about the cooking member. Where the cooking member is an elongate member made of a flexible material, the cooking apparatus may include a component for bending the elongate member substantially into a circle, the predetermined shape being toroidal.

In accordance with another feature of the present invention, an injector is provided for depositing an edible filling into the chamber after the pulling of the elongate member from the cooked dough.

In accordance with a further feature of the present invention, the removal mechanism includes parts for removing multiple cooking members from multiple pieces of cooked dough simultaneously to thereby create a chamber in each of the pieces of cooked dough.

It is contemplated that the various parts of the machine, including the cooking apparatus, the removal mechanism and the injector are fixed relative to one another along an assembly line.

A method for making a food product comprises, in accordance with the present invention, cooking an aliquot of dough having an internal chamber formed by disposing the dough in a predetermined shape about a cooking member made of a material which has a chemical composition essentially impervious to cooking temperatures and operating a mechanism for automatically removing the cooking member from the dough, thereby opening the chamber in the dough. As discussed above, the mechanism includes a gripper disposable in grasping contact with a protruding end of the cooking member, a holder disposable in contact with the dough for restraining the dough, and a motive component operatively connected to at least one of the holder and the gripper for moving the one of the holder and the gripper relative to the other to remove the cooking member from dough.

A method for making a food product comprises, in accordance with the present invention, providing an aliquot of dough disposed in a predetermined shape about a cooking member or insert having a predetermined configuration and cooking the dough at a relatively elevated temperature for a predetermined period to form a cooked food product having an internal chamber having essentially the predetermined configuration.

In one embodiment of the method, the cooking member is maintained in the dough during the cooking thereof.

Where the cooking member is made of a material which disintegrates at cooking temperatures so that the cooking member essentially disappears by the end of a cooking operation, the method further comprises gradually disintegrating the cooking member during the cooking of the dough so that, after the cooking of the dough at the elevated temperature for the predetermined period, the cooking member has disappeared from the cooked dough, thereby creating the chamber in the cooked dough. Where the cooking member is made of a material dissolvable in water, the disintegrating of the cooking member includes dissolving the cooking member.

The providing of the aliquot of dough disposed in the predetermined shape about the cooking member or insert preferably includes molding the dough about the cooking member to form the predetermined shape about the cooking member. Where the cooking member is made of an edible composition, the method contemplates maintaining the edible composition in the chamber after the cooking of the dough to thereby form a composite food product having a filling surrounded by cooked dough.

The edible composition is generally shaped to form the cooking member prior to molding of the dough about the cooking member. The cooking member has a prescribed or predetermined configuration which is substantially identical for many instances of the cooked food product. In addition, the shaped edible composition of the cooking member may be hardened, e.g., by lowering the temperature of the shaped edible composition, prior to molding of the dough about the cooking member.

Where the cooking member is made of a material which has a chemical composition essentially impervious to cooking temperatures, the method further comprises, in a particular embodiment of the invention, removing the cooking member from the aliquot of dough prior to the cooking of the dough, the chamber essentially maintaining the predetermined configuration after the removing of the cooking member, the aliquot of dough essentially maintaining the predetermined shape after the removing of the cooking member.

BRIEF DESCRIPTION OF THE DRAWING

FIG. 2 is a schematic side elevational view of an automated assembly-line-type machine in accordance with the present invention for forming a bagel preform which is cooked in boiling and baking steps illustrated in FIG. 1.

FIG. 3 is a schematic partial top plan view of a conveyor shown in FIG. 2.

FIG. 4 is a schematic side elevational view of an automated assembly-line-type machine in accordance with the present invention for automatically removing an arcuate flexible insert or cooking member from a cooked bagel.

DESCRIPTION OF THE PREFERRED EMBODIMENTS

Figure 1:
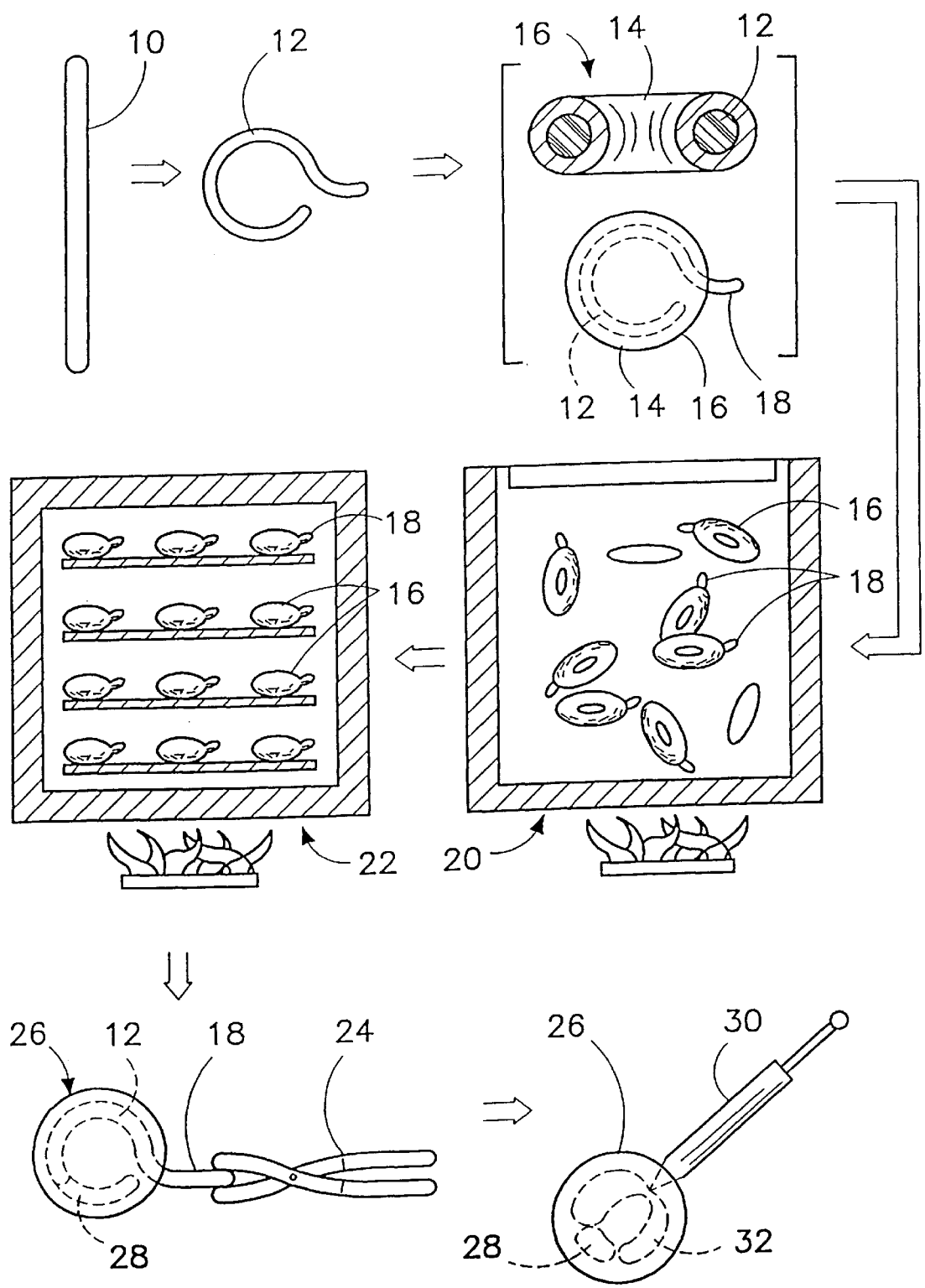
FIG. 1 is a diagram of successive steps in a method for making a hollow bagel.

As illustrated in FIG. 1, an elongate cooking member 10 for use in baking a hollow cooked food product such as a bagel is made of a flexible low-friction material which is impervious to boiling and baking temperatures. Such a material is silicone with a durometer hardness measurement of less than 30.

Cooking member 10 is bent into an arcuate, specifically a circular, form 12. Then a predetermined aliquot of bagel dough 14 is molded about the circularly bent cooking member 12 to produce a toroidal dough preform 16 in which the cooking member 12 is embedded. An end portion 18 of cooking member 10 protrudes from preform 16.

Preform 16 including circularly bent cooking member 12 is now ready for cooking by traditional steps of boiling, schematically represented at 20, and baking, schematically represented at 22 in FIG. 1. After the bagel preform has been baked, protruding end portion 18 is grasped, e.g., by a pliers 24 and pulled from the baked food item 26 to generate a hollow chamber 28.

As further illustrated in FIG. 1, a syringe 30 or other instrument may be subsequently used to inject or otherwise deposit a filling material 32 such as cream cheese or minced meat into chamber 28. An alternative filling instrument (not illustrated) would have an elongate flexible tube which is inserted into chamber 28 and withdrawn as filling material is fed through the tube to an opening at a free end thereof. This flexible tube would advantageously be provided at a distal end with an enlarged smoothly curved surface to guide the tube along hollow chamber 28. Such a guide surface may be a surface of a balloon attached to the distal end of the flexible tube. Optionally, the balloon is alternately inflatable and deflatable. The balloon or other camming-type surface prevents the distal tip of the flexible tube from catching on the cooked dough material of the baked food item 26.

It is to be noted that preform 16 may take a form other than toroidal. A food product produced from the preform may be elongate.

The use of a cooking member as described hereinabove may be used to produce hollow food products other than bagels, such as muffins and doughnuts. Also, preform 16 with a straight or bent cooking member 12 may be produced at a first, central, location such as a factory and shipped to remote locations (bakeries) for cooking.

It is generally contemplated that cooking element 10 has a predetermined substantially constant size. However, if a suitable material is available, it would be possible to make the cooking member as an inflatable balloon member. In that event, heating of the balloon and the gases (air) inside it during the cooking process will expand the balloon member further, if only relatively incrementally.

FIG. 2 schematically depicts a machine for automatically forming preform 16. A conveyor belt 34 is provided with a plurality of spaced bottom mold halves 36 each in turn provided with a plurality of vertically oriented pins 38. Pins 38 are slidably attached to the respective bottom mold halves 36 in order to move from a lowered neutral or storage position indicated at 40 to an elevated arrest configuration indicated at 42. Pins 38 are shifted vertically upward from lowered neutral position 40 to elevated arrest configuration 42 owing to a camming action arising from the motion of conveyor belt 34, mold halves 36 and pins 38 along a camming surface 44.

At a first station along a path of movement of belt 34 is disposed a first dough hopper 46. A door 48 provided at a lower end of hopper 46 prevents a deposition of dough onto conveyor belt 34 unless a mold half 36 is located below the hopper. At that time, door 48 is shifted sideways, as indicated by an arrow 48. After a predetermined amount of dough (not shown) has fallen from hopper 46, door 48 is shifted back into the illustrated closure position below the lower end of the hopper. A cutting edge 50 at one end of door 48 severs the predetermined amount of falling dough from the dough remaining in hopper 46.

At a second station along a path of movement of belt 34 is disposed a device 52 for bending cooking member 10 into a generally circular form. An automatically driven flexible rod 54 pushes cooking member 10 through a helical passageway or groove 56 in device 52 until the cooking member rests in a circular configuration on a door 58 at a lower end of device 52. Upon the arrival of a mold half 36 directly below device 52, door 58 is moved laterally to permit a deposition of the bent cooking member onto the dough placed into the mold half at hopper 46. The entire device 52 may be shifted temporarily downwardly to facilitate the proper deposition of the circular cooking member 10 onto the dough and inside a ring of elevated pins 28. Pins 38 serve to maintain cooking member in a curved configuration during the deposition of another predetermined amount of dough 61 from a second hopper 60 over the cooking member 10 and the first amount of dough deposited by hopper 46. Hopper 60 is provided with a reciprocatable door 62 having a cutting edge 64.

At a subsequent station along the path of movement of belt 34, an upper mold half 66 having a cavity 68 is pressed onto the dough deposited by hopper 60 to shape the two aliquots of dough and connect them to one another. To that end, mold half 66 and/or mold half 36 may be provided with vibrators and other devices for ensuring that the two dough portions are intertwined with one another. Concurrently with the above described shaping or molding operation, pins 38 are withdrawn from the combined dough aliquots. This may be accomplished by several methods which will occur to one skilled in the art. A vacuum device (not shown) may ascend and contact the bottom of lower mold half 36 via a rubber seal ring. Application of vacuum will draw pins 38 from the mold. Alternatively, an electromagnet (not shown) may be placed against the bottom of mold half 36 and energized to attach pins 38, which are advantageously made of stainless steel for contact with foodstuffs. The electromagnet may then be lowered, thereby withdrawing the pins.

It is to be noted that the above-described basic assembly line technique may be modified in various ways. For example, hopper 46 may be eliminated, with all of the dough being provided by hopper 60. In that case, a removable lower support is provided for the circularly bent cooking member 10. Such a lower support may comprise a plurality of additional sliding pins. The pins allow the dough to flow around the cooking member during dough deposition and additionally allow the dough to flow together and close up upon the application of molding pressure by upper mold half 66.

As illustrated in FIG. 3, pins 38 are disposed in a generally circular configuration in a toroidal cavity 70 which is a mirror image of cavity 68 in upper mold half 66. Cavity 70 has an extension 71 for receiving end portion 18 (see FIG. 1) of cooking member 10.

After the formation of preform 16 as described above with reference to FIG. 2, boiling and baking steps are performed as described hereinabove with reference to FIG. 1. These steps may be implemented in accordance with conventional processing techniques.

FIG. 4 shows machine removal of cooking member 10 from a cooked bagel 72. Bagel 72 is deposited on a conveyor belt 74 inside a ring of lowered retaining pins 76. As conveyor 74 moves along its pre-established path of transport, pins 76 are elevated by a camming surface 77 so that the pins substantially surround bagel 72, particularly on a side thereof from which end portion 18 of cooking member protrudes from bagel 72. A grasping device 78 including a chuck or clamp 80 then grips end portion 18, owing to operation of a rotary drive 82. A translatory drive 84 then moves grasping device 78 away from bagel 72 while the bagel is held by retaining pins 76. The removed cooking member 10 is illustrated at 86. A nozzle 88 connected to a pressurized filling reservoir 90 is then moved into position by a drive 92 and injects comestible filling material inside the hollow bagel 72. Techniques for injecting fluidized comestible compositions into food preforms are well known to those skilled in the art. Subsequent to the injection or filling operation, the completed filled bagel is mechanically jostled by a jostling mechanism (not illustrated), which may take the form of one or more pneumatic jets, delivering puffs of air. This jostling aids in the disengagement of pins 76 concurrent with recession of camming surface 77 following final processing on belt 74, which disengagement may also be vacuum or magnetically assisted as described above. Pins 38 and 76 will advantageously be given a tapered or conical head shape, to facilitate withdrawal from dough, and minimize damage to the finished product.

It is to be noted that grasping device 78 may approach bagel 72 from a trailing side thereof. In that case, bagel 72 is deposited onto conveyor belt 74 so that end portion 18 points in an upstream direction, i.e., counter to the direction of transport of belt 74. Pins 76 are clustered by the end portion 18, on an upstream or trailing side of bagel 72, for holding the bagel while grasping device 78 holds cooking member 10. The movement of conveyor belt 74 serves to separate bagel 72 and grasping device 78 and remove the cooking member 10.

In an alternative process for producing a hollow comestible product such as a bagel, the function of cooking member 10 is performed by a generally rigid insert made of a dissolvable material. This material should be biologically compatible or edible, such as ice, sugar, frozen gelatin, or salt. Where a hollow bagel is cooked by boiling and baking steps, the insert may be a generally circular piece of ice with a sugar and/or salt content selected to control the rate of dissolution of the insert in the hot water of the boiling step. The salt and/or sugar content will also be selected to vary the flavoring of the eventual food product. For example, the insert might have a core of pure water and an outer layer which has a substantial sugar and/or salt concentration. In that case, the higher sugar and/or salt concentration of the outer layer of the cooking insert delays the disintegration and dissolution of the insert during the initial stages of a boiling procedure. In addition, the salt and/or sugar may be deposited in a greater or lesser concentration on an inner surface of the food product, thereby providing a desirable flavoring.

A dissolvable cooking insert may itself be hollow. During a molding procedure, dough is placed about the cooking insert so as to surround the insert. Mold forms may then close about the dough and the embedded cooking insert, to shaped the dough into a desired form.

In another alternative process for producing a comestible product such as a bagel, the function of cooking member 10 is performed by an insert made of an edible material such as a tuna fish and/or a ham and cream cheese composition. Generally, the food material used for the cooking member or insert should be capable of being hardened, for example, by a freezing process. First the edible insert material is sculpted, molded, or otherwise shaped into the desired form. Then the shaped material is hardened, for example, by a freezing process. Alternatively, a layer of a digestible material, such as sugar or salt or a biocompatible monomer or polymer, may be formed around the basic material and hardened into a shell by a transfer of energy such as heat energy (freezing or convection cooking), electromagnetic energy (infrared radiation), vibrational energy (ultrasonic pressure waves), etc.

After the hardening of the insert or a shell layer thereof, dough is molded about the insert. The entire preform is then subjected to a cooling process. Subsequently, the insert remains in the cooking bagel (or other food product) as a filling. Of course, the cooking of the dough may also cook the material of the insert.

It is to be noted that the same mechanism for automatically removing a cooking member from a cooked bagel may be used to remove the cooking member from the dough prior to the cooking thereof. The dough is optionally chilled prior to removal of the cooking member to facilitate maintenance of the shape of the dough during and after the removal of the cooking member. In general, a flexible cooking member made of heat impervious material may be removed from an aliquot of dough before or after the cooking process.

Figure 5:
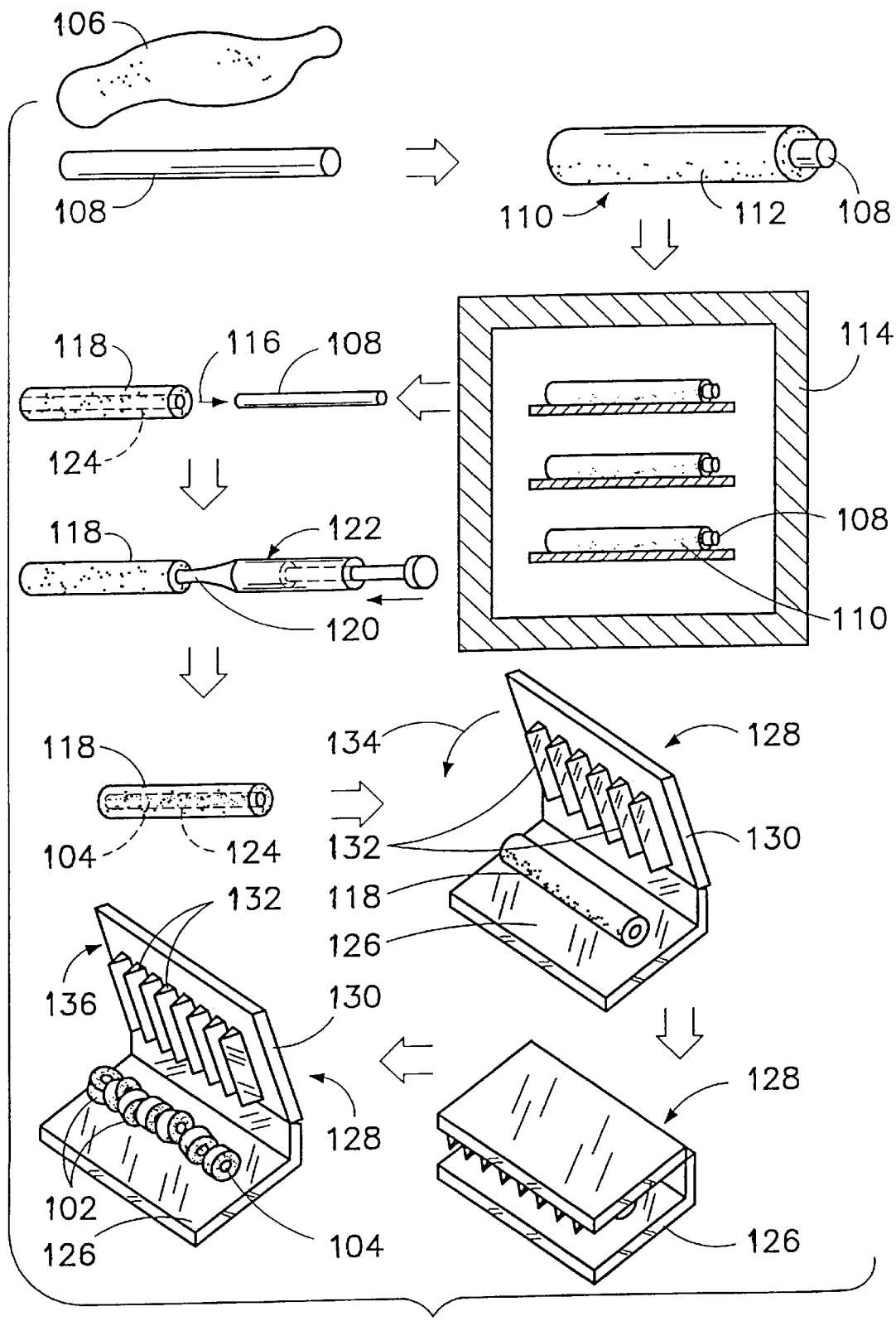
FIG. 5 is a diagram of successive steps in a method for making a bagel with a filled center.

FIG. 5 illustrates successive steps in a method for producing multiple bagel-type food products 102 each having a filling material 104 disposed in a center opening (not separately designated). A predetermined amount of dough 106 is molded or otherwise disposed about an elongate cooking member 108 to form a preform 110. Cooking member 108 is made of a material impervious to cooking temperatures. Preform 110 comprises dough 106 molded into a cylindrical shape 112 coaxially surrounding cooking member 108. After the formation of preform 110, the preform is placed in a baking oven 114 where the dough 106 of preform is baked. Thereafter, the preform is removed from baking oven 114 and the cooking member 108 is removed, as indicated by an arrow 116, thereby producing a baked farinaceous tubular intermediate product 118. At that juncture, a nozzle 120 of a hydraulic type injector 122 is inserted into a lumen or chamber 124 in intermediate product 118. Injector 122 is actuated to inject comestible food composition or filling 104 into lumen 124. Subsequently, tubular intermediate product 118 with a substantially predetermined quantity of injected food composition 104 is placed on a platen 126 of a slicing device 128 having a pivotally movable flap 130 carrying a plurality of parallel blades 132. Flap 130 is pivoted, as indicated by an arrow 134, to slice tubular intermediate product 118 with the injected food composition 104 in a plurality of spaced planes (not shown). Upon a pivoting of flap 130 back into a rest position, as shown at 136, multiple bagel-type food products 102 each having a filling material 104 disposed in a center opening (not separately designated) are produced.

Although the invention has been described in terms of particular embodiments and applications, one of ordinary skill in the art, in light of this teaching, can generate additional embodiments and modifications without departing from the spirit of or exceeding the scope of the claimed invention.

For example, other mechanisms are well within the ordinary skill in the art for holding a cooked bagel, on the one hand, and the cooking member 10, on the other hand, and for pulling the bagel and the cooking member in opposite directions to extricate the cooking member from the bagel. Where a multiplicity of bagels are disposed in a line so that the end portions 18 of the respective cooking members are pointed in the same direction, a plate may be used to retain all of the bagels simultaneously. Similarly, a pair of bars may be used for clamping all of the protruding ends of the cooking members simultaneously. Various drives are operatively connected to the bars for shifting them together towards the bagels, for clamping the bars and subsequently separating them from one another, and for moving the bars relative to the retaining plate and the held bagels.

Other mechanisms will occur to one skilled in the art for automatically bending cooking member 10 into an arcuate form and molding dough about the bent cooking member. For instance, cooking member 10 may be deposited on an inflated balloon inside a mold cavity. As dough is injected into the mold cavity, the balloon is deflated and withdrawn from the cavity. It is to be understood that the cooking of bagel dough to produce bagels need not include a boiling step, as is frequently the case in contemporary bagel production methods.

Also, in producing a bagel having an internal chamber for receiving an edible composition, the dough may be molded about an elongate flexible cooking member disposed in a linear configuration. The cooking member with the surrounding shaped dough is then bent into a desired circular configuration. In general, some adjustment in the configuration of the preform may be made after the placement of the dough about the cooking member, at least where the cooking member is a flexible element or a manipulable edible composition.

It is also within the contemplation of the present invention that the cooking member or insert is a flexible balloon type member which may be filled with oil or other fluid capable of withstanding boiling temperatures without volatilizing. The oil is siphoned off prior to removing the balloon or bag from the cooked or uncooked food product. In this case, the friction between the deflated cooking member and the dough body may be so small that the restraint for holding the doughy body may simply be frictional forces of a surface on which the doughy body rests.

Accordingly, it is to be understood that the drawings and descriptions herein are proffered by way of example to facilitate comprehension of the invention and should not be construed to limit the scope thereof.

What is claimed is:

1. A machine for making a food product, comprising:
   cooking apparatus for cooking an aliquot of dough formed by disposing said dough in a predetermined shape about a cooking member made of a material which has a chemical composition impervious to cooking temperatures; and
   a mechanism for removing said cooking member from the dough, thereby forming a chamber, said mechanism including:
   a gripper in grasping contact with a protruding end of said cooking member;
   a holder in contact with the dough for restraining the cooked dough; and
   a motive component operatively connected to at least one of said holder and said gripper for moving said one of said holder and said gripper relative to the other to remove the cooking member from dough.

2. The machine defined in claim 1 wherein said cooking apparatus includes a baking oven.

3. The machine defined in claim 2, further comprising a molding component for shaping said dough about said cooking member to form said predetermined shape about said cooking member.

4. The machine defined in claim 3 wherein the cooking member is an elongate member made of a flexible material, further comprising means for bending said elongate member substantially into a circle, said predetermined shape being substantially toroidal.

5. The machine defined in claim 4, further comprising an injector for depositing an edible filling into said chamber after the pulling of said elongate member from the cooked dough.

6. The machine defined in claim 1 further comprising a molding component for shaping said dough about said cooking member to form said predetermined shape about said cooking member.

7. The machine defined in claim 1 wherein the cooking member is an elongate member made of a flexible material, further comprising means for bending said elongate member substantially into an arcuate form and forming the uncooked dough about the arcuate form of said elongate member.

8. The machine defined in claim 1, further comprising an injector for depositing an edible filling into said chamber after the pulling of said elongate member from the cooked dough.

9. The machine defined in claim 1 wherein said mechanism includes parts for removing multiple cooking members from multiple pieces of cooked dough simultaneously to thereby create a chamber in each of the pieces of cooked dough.

10. A method for making a food product, comprising:
    cooking an aliquot of dough having an internal chamber formed by disposing said dough in a predetermined shape about a cooking member made of a material which has a chemical composition impervious to cooking temperatures;
    actuating a mechanical gripper to grasp a protruding end of said cooking member;
    operating a holder mechanism to contact the dough and restrain the dough; and
    activating a motive component operatively connected to at least one of said holder and said gripper to move said one of said holder and said gripper relative to the other to remove the cooking member from at least partially cooked dough to thereby form a chamber in said at least partially cooked dough.

11. A method for making a food product, comprising:
    providing an aliquot of dough disposed in a predetermined shape about a cooking member or insert having a predetermined configuration;
    cooking said dough at a relatively elevated temperature for a predetermined period to form a cooked food product having an internal chamber having said predetermined configuration; and
    maintaining said cooking member in said dough during at least an initial portion of the cooking of said dough;
    the cooking member being made of a material which disintegrates at cooking temperatures so that the cooking member disappears by the end of a cooking operation, further comprising gradually disintegrating said cooking member during the cooking of said dough so that, after the cooking of said dough at said elevated temperature for said predetermined period, said cooking member has disappeared from the cooked dough, thereby creating said chamber in the cooked dough.

12. The method defined in claim 11 wherein the cooking member is made of a material dissolvable in water, the disintegrating of said cooking member including dissolving said cooking member.

13. A method for making a food product, comprising:
    providing an aliquot of dough disposed in a predetermined shape about a cooking member or insert having a predetermined configuration; and
    cooking said dough at a relatively elevated temperature for a predetermined period to form a cooked food product having an internal chamber having said predetermined configuration,
    the cooking member being made of a material which has a chemical composition impervious to cooking temperatures, further comprising removing said cooking member from said aliquot of dough to thereby open said chamber, also comprising slicing said dough in a plurality of substantially parallel planes after the cooking of said dough.

14. The method defined in claim 13, additionally comprising injecting a comestible composition into said chamber prior to the slicing of said dough.

15. A composite dough preform comprising an aliquot of dough disposed in a predetermined shape about a cooking member or insert made of a material which disintegrates at cooking temperatures.

16. A composite dough preform comprising an aliquot of dough disposed in a predetermined shape about a cooking member or insert, said cooking member being made of a material which is dissolvable in water so that upon cooking said aliquot of dough, said cooking member or insert dissolves at cooking temperature, thereby forming a chamber in the cooked dough.

17. The preform defined in claim 16 wherein the material of said cooking member is taken from the group consisting of ice, salt, sugar, and frozen gelatin.

18. A method for making a food product, comprising:

providing an aliquot of dough disposed in a predetermined shape about a cooking member or insert having a predetermined configuration, said cooking member being made of a flexible material which has a chemical composition impervious to cooking temperatures; and removing said cooking member from said aliquot of dough, said chamber maintaining said predetermined configuration after the removing of said cooking member, said aliquot of dough maintaining said predetermined shape after the removing of said cooking member, the removing of said cooking member from said aliquot of dough including unbending said cooking member from an arcuate configuration; and after the removing of said cooking member from said aliquot of dough, cooking said dough at a relatively elevated temperature for a predetermined period to form a cooked food product having an internal chamber having said predetermined configuration.

19. The method defined in claim 18 wherein the removing of said cooking member includes pulling said cooking member from said dough.

\* \* \* \* \*